July 6, 1965

J. R. PIER 3,192,879

PRESSURE CONTROLLED CARGO DUNNAGE BULKHEAD
SYSTEM FOR FREIGHT CARS

Filed April 26, 1962

*INVENTOR.*
JEROME R. PIER

BY Ralph W. McIntire, Jr.

*ATTORNEY*

July 6, 1965

J. R. PIER 3,192,879

PRESSURE CONTROLLED CARGO DUNNAGE BULKHEAD
SYSTEM FOR FREIGHT CARS

Filed April 26, 1962

INVENTOR.
JEROME R. PIER

BY *Ralph W. McIntire, Jr.*

ATTORNEY

United States Patent Office 3,192,879
Patented July 6, 1965

3,192,879
PRESSURE CONTROLLED CARGO DUNNAGE
BULKHEAD SYSTEM FOR FREIGHT CARS
Jerome R. Pier, Trafford, Pa., assignor to Westinghouse
Air Brake Company, Wilmerding, Pa., a corporation
of Pennsylvania
Filed Apr. 26, 1962, Ser. No. 190,287
10 Claims. (Cl. 105—369)

This invention relates generally to dunnage apparatus for freight carrying vehicles, and relates particularly to pressure controlled expandable bulkheads disposed between cargo units in the vehicle to hold and cushion the units against shifting and shock in the event of jolt during transit.

It has heretofore been proposed to provide a dunnage system with dunnage members in the form of a single large air mattress disposed between a pair of relatively laterally movable rigid panel members, each of the air mattresses being chargeable with fluid under pressure from a common control pipe and being interposed between the cargo units in a freight carrying conveyance in a deflated condition during loading of the cargo, whereafter the bags are inflated at pressures above the ambient pressures after loading of the cargo units. The inflation of the dunnage bag members in excess of ambient pressure causes an expansion of the bag members and a corresponding relative movement of the panel members so as to shore the cargo units and thus prevent shifting of, and damage thereto, in the event of shock impacts to the conveyance during transit.

These prior art expandable bulkhead units each comprises a single large bag six to eight inches in thickness, confined between a pair of relatively movable rigid panels and having a lateral surface area of about 9200 square inches contacting each panel of the unit. The bag member of each unit is chargeable with fluid under pressure from a common control pipe connected to all units so as to inflate the bags, after loading, to pressure in excess of ambient pressure causing expansion of the bags and corresponding relative movement of the panels of each unit to resiliently shore the cargo units in the vehicle. The bags are inflated, when the cargo is loaded, to a predetermined pressure of between one-half p.s.i.g. and three p.s.i.g., selected according to the nature of the cargo. For example, the lower range of pressure is employed for more fragile cargo units susceptible to crushing and the larger range of pressure is employed with more rigid units. The preselected gage pressure for inflating the bag members is introduced at the point of loading. However, during transit to the point of destination, the barometric pressure or temperature within the car may vary thereby to cause a corresponding variance in the shoring force exerted by the inflated dunnage air units. For example, because of the extreme size of the individual dunnage bag members and the attending large volume of approximately 30 to 40 cubic feet per bulkhead unit, the shoring force exerted by the individual expandable bulkhead units of the above-specified surface dimensions varies 575 lbs. for every ounce per square inch change in gage pressure in the dunnage bag members and varies 4600 lbs. for every inch of mercury change in barometric pressure due to weather changes or changes in altitude, and varies about one percent for each six degrees Fahrenheit change in temperature. Thus, if the air pressure in the expandable bulkhead dunnage units increases even very slightly during transit from its point of origin to its point of destination, the cargo may be crushed, whereas if the gage pressure is reduced even slightly, the cargo may be inadequately shored and thus be able to shift and become damaged.

In the prior art devices it is proposed to provide a control for compensating for barometric and temperature changes so as to maintain the gage pressure substantially constant during transit. This is accomplished by a complex mechanical and pneumatically operated valve control device associated with the source of pressure mounted on the car. While this method has proven to be satisfactory, it is relatively costly and has required constant inspection and maintenance. Moreover, because of the ballooning effect of the large bags, the panels must be very heavy in construction to insure equal load distribution, and low pressure air is require to prevent crushing the cargo because of the previously mentioned large volume within the individual bag members.

It is an object of this invention to provide a pressure control expandable bulkhead system which is relatively insensitive to pressure changes dependent upon barometric pressure and temperature during transit thereby to eliminate the need for special complex pressure control devices and thus reduce the cost and increase the reliability of the dunnage system.

In accordance with the present invention, this is accomplished by providing between a pair of relatively laterally movable rigid panels a plurality of spaced interconnected relatively small air dunnage members or bags, which are secured by bonding or mechanical fastening means to one or both of the panel members. The bags in each expandable bulkhead unit are individually connected to the output of a manifold to assure equal pressure within all the bags. The input of the manifold is connected to a source of pressure supply for maintaining the bags at a fixed pressure. The bags may be of such size as to allow the utilization of an easily controlled pressure which could be supplied or maintained from a pressure source and would thus eliminate the delicate control now required to maintain the low pressure in the large dunnage bag to such close limits as to compensate for atmospheric pressure changes and ambient temperature changes. The use of a plurality of small bags greatly decreases the total required volume of pressurized air between the rigid panels of each expandable bulkhead unit, but equal load distribution is assured by balanced spacing of the bags between the panels. The panels, therefore, can be lighter in construction and cheaper without any sacrifice in basic function. At the same time, because of the smaller surface areas of the bags, higher pressures may be utilized within the bags, thus permitting the use of smaller, cheaper, more reliable standardized regulating valve devices for pressure control.

For example, the use of five equally spaced bag members disposed between a pair of panel members, each panel member having an area of about 9200 square inches, as in the above example, and each bag member having a diameter of about 12 inches and thus surface area of about 113 square inches in contact with each panel, will provide a total force on each panel equivalent to the force applied by the single large bag in the prior art example discussed above, when the bags are charged at a pressure of about 5 to 10 p.s.i., approximately double the pressure applied to a single large bag. Because of the decreased total volume of air in the bags and the relatively higher pressure, the effect of ambient pressure and temperature changes on the dunnage bag system is reduced, thus permitting the use of smaller, cheaper conventional valve control devices required to maintain a constant pressure in the bags during transit. It is apparent that following this principle, further reduction in bag sizes with corresponding increases in bag pressure may be made as desired to maintain the desired total force on the panel members, and further reduce the effect of ambient pressure or temperature changes, and at the same time more directly relate the bag pressures to whatever pressure source is available. For example, for panels of the above described area, reduction in total bag area in contact with each panel to about ½% of the panel area permits a pressure increase to about 100 p.s.i., the standard pressure available in pneumatic brake systems for trains thus permitting the elimination of pressure regulating means between the pressure source and the dunnage system, and at the same time reducing the effect of ambient pressure changes to a negligible value. In any event, decreasing the total volume of the air in the dunnage system by decreasing the size of the individual expandable means, and at the same time increasing the pressure in the members in inverse proportion with respect thereto decreases the effect of ambient pressure and temperature changes upon the force applied by the dunnage system.

Other objects and advantages will become apparent from the following, more detailed description of the invention and from the accompanying drawings, in which.

Figure 1:
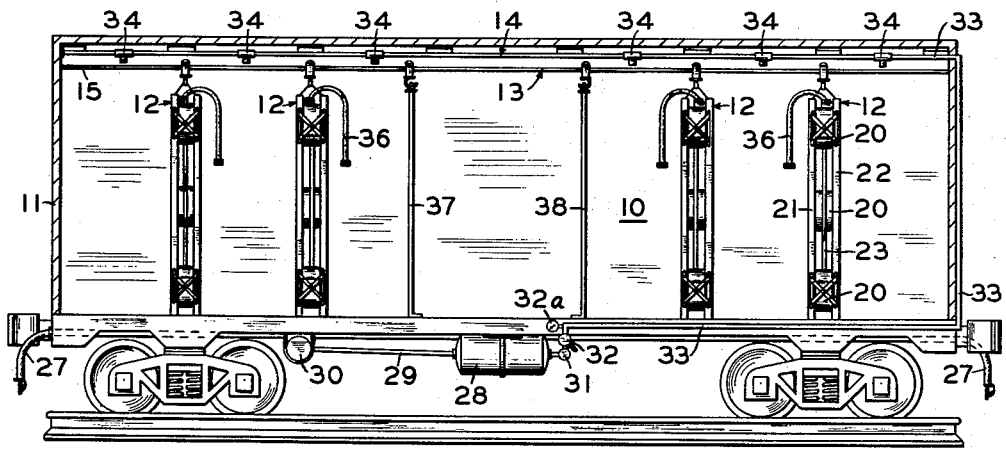
FIG. 1 is a longitudinal cross-sectional view in elevation of an empty freight car equipped with the expandable bulkhead system embodying the principles of the present invention.

Referring now to the drawing, the dunnage system 10 of the present invention is shown embodied in a railroad freight car 11. It is to be understood, of course, that the dunnage system disclosed herein is also capable of being used with trailer trucks or other freight hauling vehicles.

The dunnage system 10 comprises generally a plurality of expandable bulkhead units 12, a conveyance system 13 for selectively moving the unit within the car, and a pressure system 14.

The expandable bulkhead unit conveying system 13 includes a pair of rails 15 and 16 suitably mounted on the inner surface of the top of the freight car 11. Supported for rolling movement on the rails 15 and 16 are hangers or carriages 17 having suspended therefrom hooks 18. Each hook 18 carries one of the bulkhead units 12, as hereinafter described.

Figure 4:
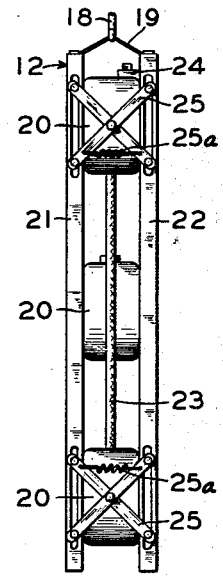
FIG. 4 is a side elevational view of one of the expandable bulkhead units of the dunnage system of FIG. 1.

Each of the expandable bulkhead units 12 comprises a plurality of expandable members 20, in this instance five inflatable bags, disposed in predetermined spaced relationship between a pair of rigid rectangular panel members 21, 22, the panel member being suspended from a hook 18 in the suspension system by means of a flexible cable 19 connected at its ends to the panel members. The bags 20 may be attached to either one or both of the panel members 21, 22 by any suitable means, such as by bonding or mechanical fasteners. Each of the members 20 is connected through a suitable individual piping element 23 (FIG. 4) to a different one of the outputs of a manifold 24 which is attached to the inside of the panel member 22 to thus minimize leakage which may be caused by abrasion or vibration if the manifold were free to swing between the panel members.

The expandable members 20 are shown in a preferred form as inflatable circular bags but may assume other forms such as cylinders or bellows, if desired, the cylinders or bellows providing a constant area in contact with the panels to provide a change in force directly proportional to a change in pressure in the dunnage system.

A plurality of expandable aligning elements 25, which may be of the familiar scissor or lazy tong type, may be provided connecting the panels 21, 22 of each bulkhead unit 12 to assure that the panel elements will remain in substantially parallel planes whether the individual unit is expanded or contracted to prevent collapse of the expansible bulkhead unit 12 on one side and prevent overexpansion on the other side, thus assuring uniform action of the bulkhead unit against a non-uniform load adjacent the bulkhead unit. Biasing means 25a, which may comprise springs, may be added to bias the panel members 21, 22 toward each other when pressure in the bag members 20 is reduced, to thus facilitate convenient handling of the bulkheads 12 during loading and to facilitate a more rapid unloading.

It is to be understood that any number of bags may be utilized between each pair of panel members. However, the bags should be equally spaced to provide uniform pressure on the panel members.

It is also to be understood that if desired, a constant flow rate valve, not shown, may be provided in each of the piping elements 23 to shut off flow to the corresponding bag 20 if the bag should rupture or leak excessively.

Figure 2:
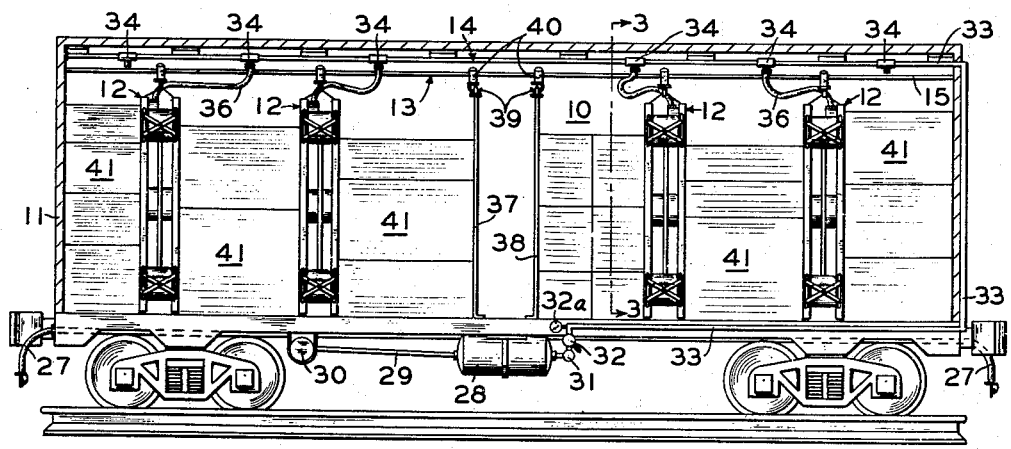
FIG. 2 is a view similar to FIG. 1 except that it shows the dunnage bags in their operative shoring position between the units of cargo for effectively cushioning the cargo against shock.
Figure 3:
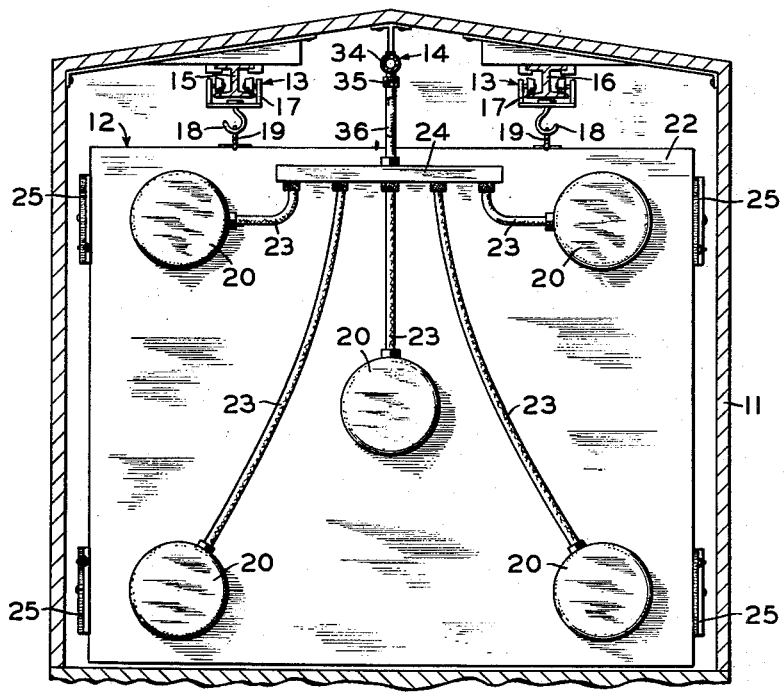
FIG. 3 is a fragmentary end view of the car taken along the lines 3—3 of FIG. 2.

The pressure system 14, as shown in FIGS. 1 and 2, is supplied by an independent compressed air system comprising a tank or reservoir 28 supplied through a pipe 29 from a standard compressor unit 30 suspended beneath the car body and driven by motion of the car wheels by a conventional drive mechanism, the latter being omitted from the drawing for simplification of the disclosure. The fluid under pressure flows from the tank 28 through a standard pressure reducing and regulating valve 31 and an operating valve 32 to pipe 33 which extends immediately underneath the roof of the car and along the longitudinal center of the car. A pressure gauge 32a is shown as positioned adjacent the air supply valve 32 and connected to provide pressure readings in pipe 33 and thus readings of pressure in bulkheads 12. However, it will be understood that the pressure gauge 32a may be positioned in the pipe 15 at the extreme left end of the car 11 for providing more accurate reading of the pressure in the bulkhead units, and an appropriate pressure telemetering system may be added thereto for providing convenient reading at the air supply valve 32. A pipe connection 34, which may comprise a safety shut-off valve, if desired, is provided to connect the input of each manifold 24 of each bulkhead unit to the input pipe 33. After the fluid flows through the shut-off valve 34, it passes through a standard quick detachable coupling 35 (FIG. 3) and through a flexible hose connector 36 to a particular manifold input.

The conventional brake pipe 27 extends from one end of the car to the other and is provided at its ends with the usual brake pipe hose coupling means. The conventional brake control valve apparatus mounted beneath the car and connected to the brake pipe 27 is omitted from the drawing for convenience of illustration.

Also suspended by the rails 15, 16 for longitudinal movement are a pair of wire screens or grids 37, 38 which are supported by means of eyes 39 on hooks mounted on hangers 40. The screens 37, 38 provide end protectors and are especially desirable if the car is only partially loaded. The bottom ends of screens 37, 38 are suitably removably anchored by any suitable means to the floor of car 11.

Figure 5:
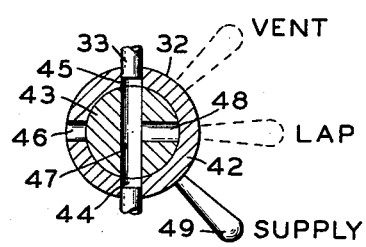
FIG. 5 is an enlarged sectional view of the air supply valve in the expandable bulkhead system of FIG. 1.

Referring now to FIG. 5, there is shown a conventional cock type of operating valve device 32 of FIGS. 1 and 2. Valve device 32 comprises a body 42, a movable valve member 43, a pair of opposed operating ports 44, 45 and an exhaust port 46 in the body 42, and a supply passage 47 and exhaust passage 48 in the valve member 43. When the valve device handle 49 is in the position shown, the valve is in the supply position and fluid is transferred through port 44, passage 47 and port 45 to provide pressure in pipe 33. When the handle 49 is moved to the remote dotted line position, the valve is in the vent position and the pipe 33 is vented to atmosphere through port 45, passage 48, passage 47 and exhaust port 46. When the handle 49 is moved to the dotted line position intermediate the OFF and ON positions, the valve is in lap position and the pressure prevailing in the bulkhead units 12 is maintained without connection to the supply pressure line.

In operation, all the collapsed expandable bulkhead units 12 are moved to one side of the empty car, and the other side is then loaded. After stacking pieces of cargo 41, an expandable bulkhead unit 12 is slid against them and additional cargo is stacked against the unit. Finally, the end partition 37 or 38 is fastened in place. Thereafter, by opening the air supply valve 32, all the expandable units are expanded by means of air under pressure supplied to the individual bag members until the units assume the expanded position shown in FIG. 2 at a predetermined maximum pressure as determined by the reducing and regulating valve 32, such as 10 p.s.i., or at a lesser pressure as indicated by the pressure gauge 32a, at which lesser pressure the air supply valve is operated to the lap position thus securely anchoring the cargo pieces and cushioning them against shock and possible damage.

Controlled expansion of the individual expandable units 12 and their positioning effectively restrain the cargo from movement and provides highly cushioned barriers to prevent damage to the cargo even when it is violently jarred.

When it is desirous to unload the car, valve 32 is operated to its "vent" position in which the air under pressure from the expandable units 12 is released promptly to atmosphere. Springs 25a coincidentally bias the panel members 21 and 22 toward each other, thus freeing the units 12 for removal of the lading as desired.

While there has been illustrated and described a specific embodiment of my invention, it will be understood by those skilled in the art that various changes and modifications may be made within the contemplation of my invention and within the scope of the following claims.

Having now described the invention, what I claim as new and desire to secure by Letters Patent, is:

1. An expandable bulkhead unit for providing a low shorting pressure in a range of one-half to three pounds per square inch between cargo units in a freight carrying conveyance, comprising: a pair of panel members, a plurality of expandable members disposed in spaced relationship with one another between said panel members, each expandable member having a surface area having a maximum diameter of substantially 12 inches in contact with each of said panel members and having a chamber expandable in response to increase in pressure therein occasioned by changes in ambient pressure and temperature and contractable in response to decrease in pressure therein occasioned by changes in ambient pressure and temperature to move said panel members apart or toward each other, respectively, and input means on each bag for connection in common to a supply means having a pressure when connected to said expandable members having said surface area inflates said expandable members to effect an exertion of a pressure in said pressure range on said cargo by said panel members.

2. The expandable bulkhead unit of claim 1, in which, the expandable members are attached to at least one of said pair of panel members.

3. The expandable bulkhead unit as recited in claim 1, and further including a manifold having a plurality of outputs each connected to the input of a different one of the plurality of expandable members, and having an input for connection to a pressure supply system.

4. The expandable bulkhead unit as recited in claim 3 in which the manifold is attached to one of the panel members.

5. The expandable bulkhead unit as recited in claim 2, in which the panel members are adapted to be independently suspended within the conveyance for relative movement toward and away from each other.

6. The expandable bulkhead unit as recited in claim 1, and further including means connecting said panel members to each other to maintain said members in substantially parallel relationship before, during and after relative movement therebetween.

7. The expandable bulkhead unit as recited in claim 6, in which said means for mounting said members in substantial parallel relationship comprises lazy tong means.

8. The expandable bulkhead unit as recited in claim 7, in which said expandable means comprises lazy tong means movably attached at one end to one panel and movably attached at the other end to the other panel.

9. The expandable bulkhead unit as recited in claim 8, in which said lazy tong means comprises a plurality of spaced lazy tong devices.

10. The expandable bulkhead unit of claim 1 in which said diameter is in the range of substantially 2 to 12 inches.

References Cited by the Examiner
UNITED STATES PATENTS

| 2,086,283 | 7/37 | Pierce | 105—369 |
| 2,529,588 | 11/50 | Beckett | 105—369 |
| 2,633,811 | 4/53 | Poage | 105—197 |
| 2,773,686 | 12/56 | Nash | 105—197 |
| 2,856,867 | 10/58 | Dasey | 105—369 |
| 3,067,699 | 12/62 | Fredriks | 105—369 |
| 3,095,987 | 7/63 | Sable | 105—366 X |

EUGENE G. BOTZ, *Primary Examiner.*

LEO QUACKENBUSH, *Examiner.*